United States Patent

Pawsat et al.

[15] 3,647,242

[45] Mar. 7, 1972

[54] ADJUSTABLE SUPPORT FOR KICKSTAND

[72] Inventors: Carlton P. Pawsat; Robert F. Humlong, both of Maysville, Ky.

[73] Assignee: Wald Manufacturing Company, Incorporated, Maysville, Ky.

[22] Filed: Jan. 9, 1970

[21] Appl. No.: 1,737

Related U.S. Application Data

[63] Continuation-in-part of Ser. No. 853,786, Aug. 28, 1969, abandoned.

[52] U.S. Cl. .................280/298, 248/188.5, 287/58 CT
[51] Int. Cl. .........................................B62h 1/02
[58] Field of Search............280/301, 304, 298, 293, 150.5, 280/150 A; 287/58 CT; 248/188.5, 411, 295

[56] References Cited

UNITED STATES PATENTS

| | | | |
|---|---|---|---|
| 456,347 | 7/1921 | Taylor | 280/298 |
| 2,340,300 | 2/1944 | Booth et al. | 287/58 |
| 583,573 | 6/1897 | Harris et al. | 280/298 |
| 874,446 | 12/1907 | Slater | 287/58 UX |
| 2,702,222 | 2/1955 | Puls et al. | 248/188.5 |
| 2,710,207 | 6/1955 | Mueller | 287/58 |
| 2,734,760 | 2/1956 | Marquis et al. | 287/58 |
| 2,817,548 | 12/1957 | Uthemann | 287/58 |
| 2,893,765 | 7/1959 | Lyon | 287/58 |

FOREIGN PATENTS OR APPLICATIONS

| | | | |
|---|---|---|---|
| 656,206 | 8/1951 | Great Britain | 280/298 |

*Primary Examiner*—Kenneth H. Betts
*Attorney*—Kinney and Schenk

[57] ABSTRACT

A kickstand for a two-wheeled vehicle has its support adjustable in accordance with the size of the vehicle. The support comprises two telescoping members and a unique clamping arrangement holding the members in engagement with each other through the clamp engaging both members.

24 Claims, 22 Drawing Figures

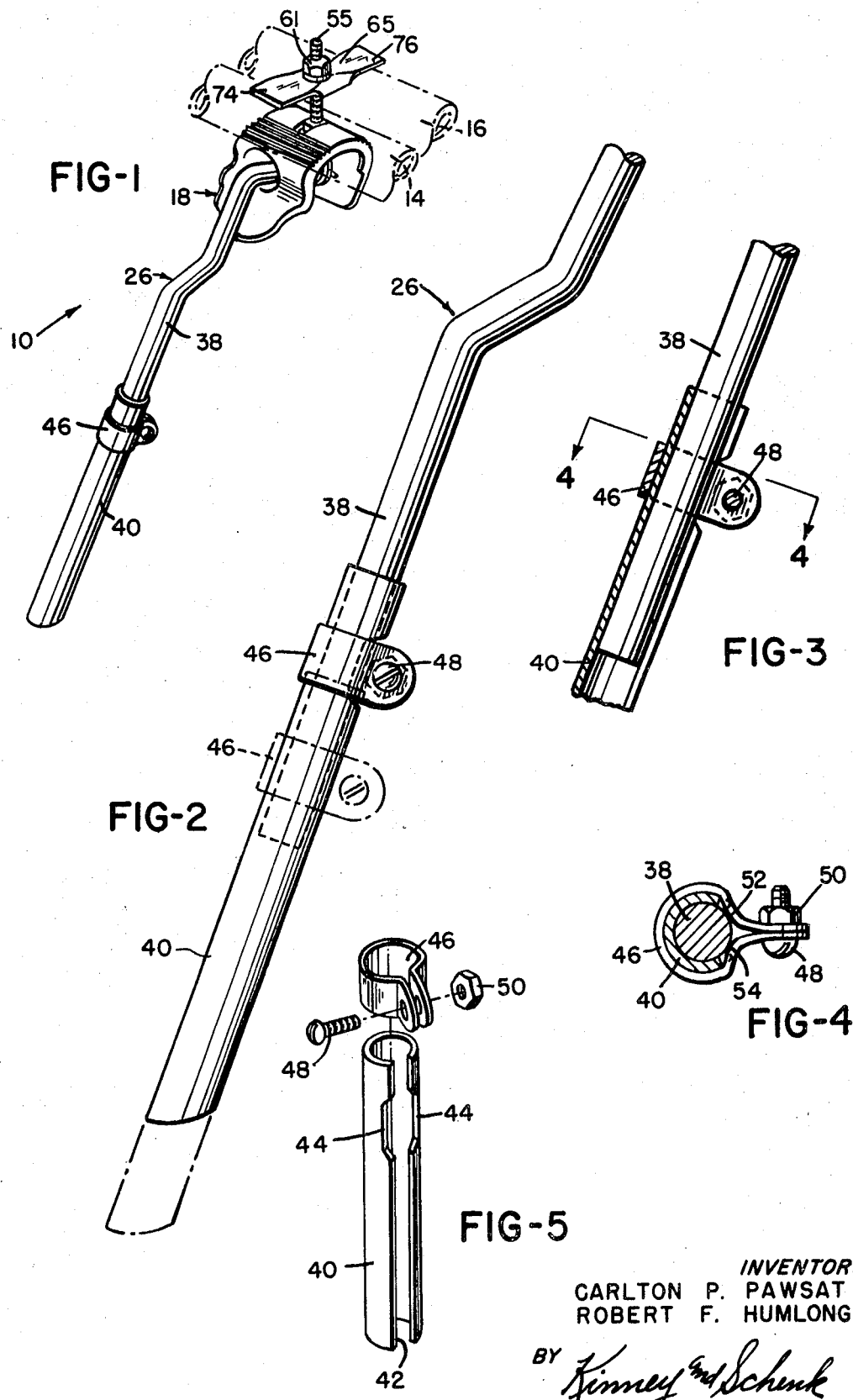

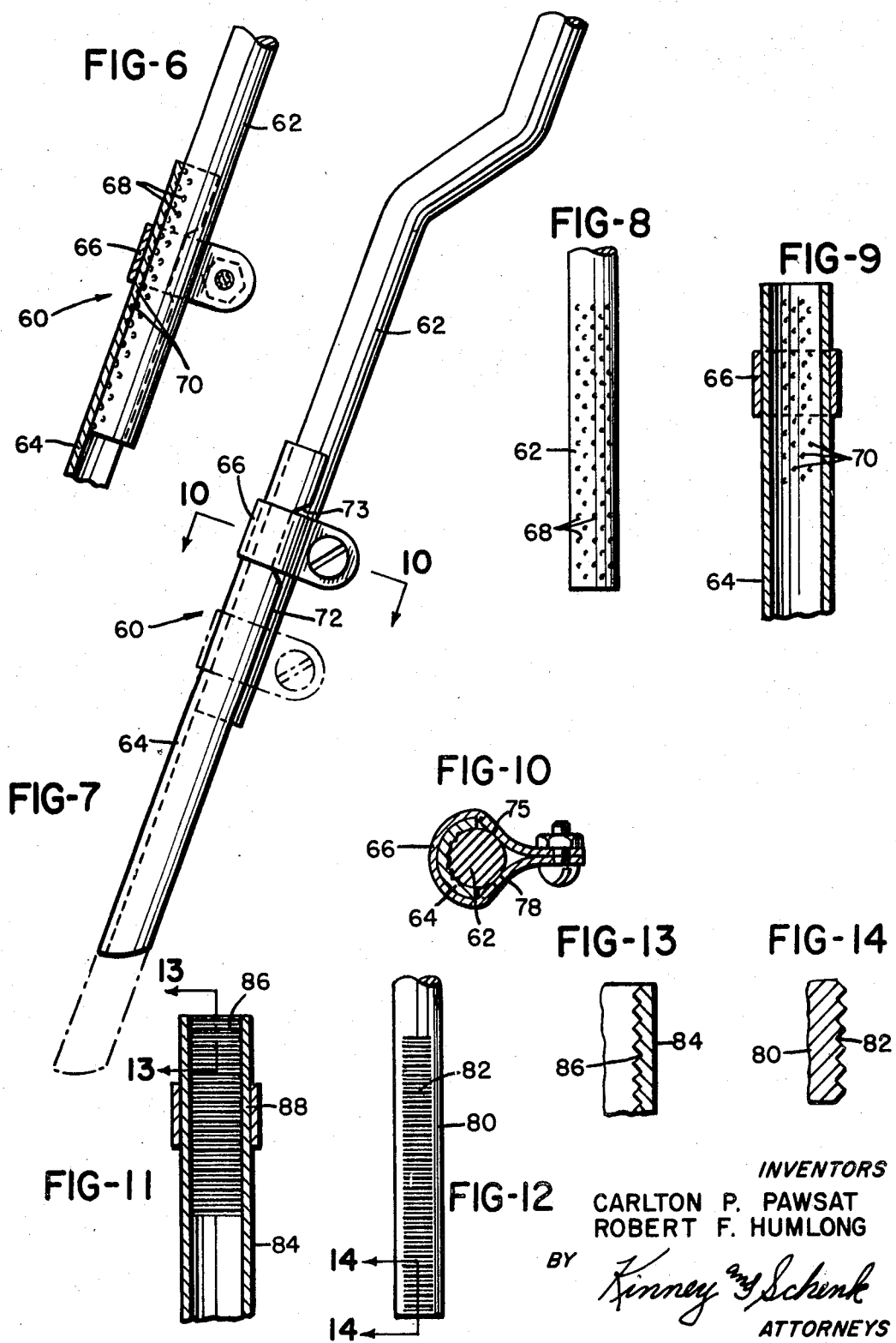

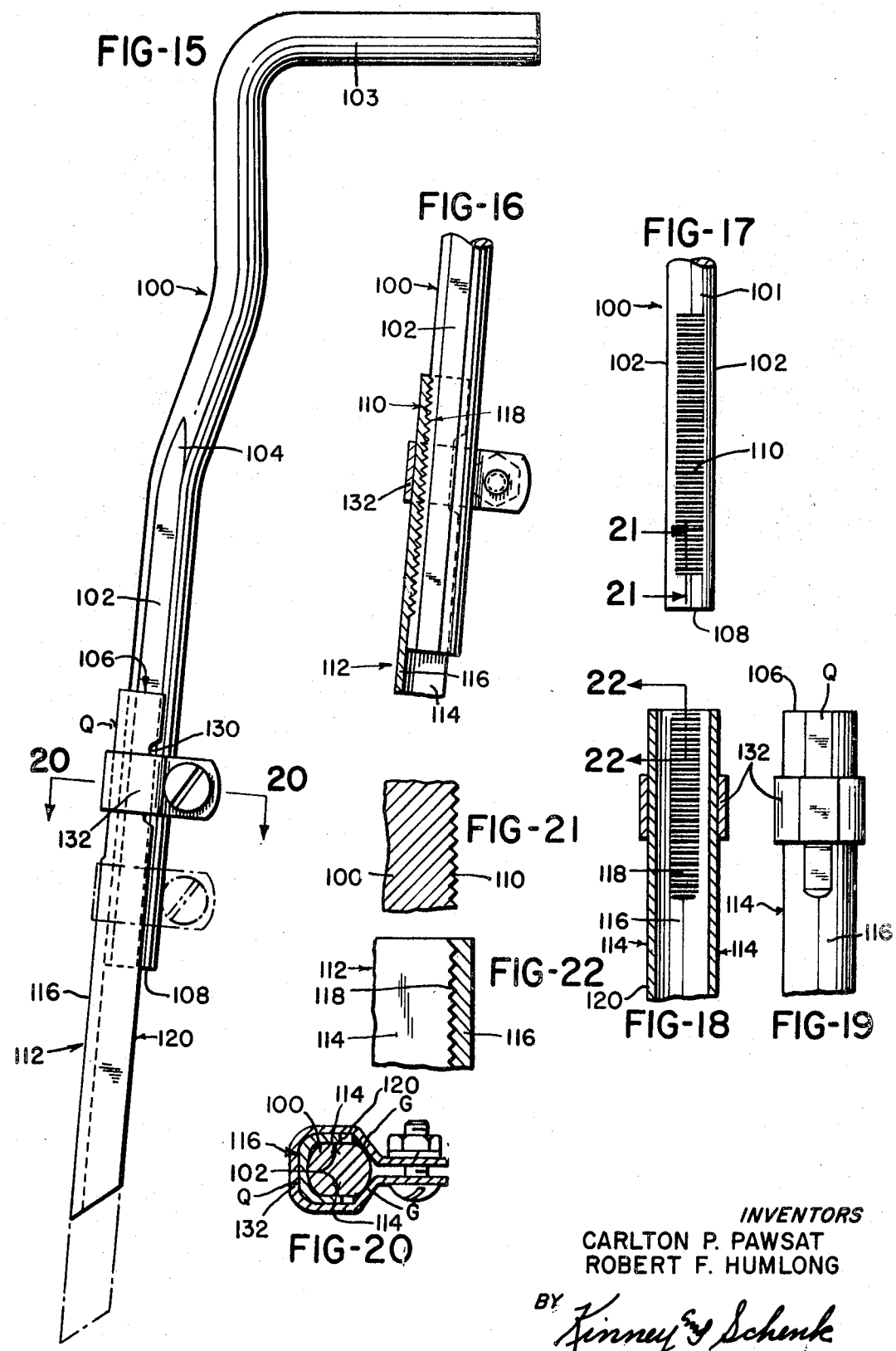

ADJUSTABLE SUPPORT FOR KICKSTAND

This is a continuation-in-part of our patent application Ser. No. 853,786 filed Aug. 28, 1969, now abandoned.

The sizes and designs of bicycles and other two-wheeled vehicles vary substantially. To obtain the economy of mass production, it is desirable that a single kickstand be capable of supporting two-wheeled vehicles of various designs and sizes.

Because of the varying sizes and designs, the length of the support means for the kickstand cannot be the same for all sizes of bicycles, for example, if the same length of support is utilized for various sizes of bicycles, the bicycle will be supported at an undesired angle even when the support bracket for the kickstand can be adjusted.

The present invention satisfactorily overcomes the foregoing problem by employing a telescoping support means for the kickstand in which the length of the support means is readily adjusted in accordance with the size of the bicycle. Thus, a single kickstand may be readily employed with bicycles of various sizes.

By utilizing a unique locking arrangement between the telescoping members of the support means for the kickstand, the present invention insures that there is no possibility of any slippage between the telescoping members even when subjected to the heavy load of the vehicle being supported. This is accomplished by having a clamp, which is part of the locking means, engage both of the telescoping members so as to be clamped to both members directly.

To increase the frictional contact between the telescoping members, some embodiments of the present invention contemplate roughing the contacting surfaces of the telescoping members. In one embodiment, each of the contacting surfaces has grooves formed therein to form an interlocking connection therebetween; and in another embodiment, each of the contacting surfaces are noncircular.

An object of this invention is to provide a kickstand having an adjustable support means.

Another object of this invention is to provide a unique clamping arrangement for locking telescoping members to each other.

Other objects of this invention will be readily perceived from the following description, claims, and drawings.

The attached drawings illustrate preferred embodiments of the invention, in which:

FIG. 1 is a perspective view showing one form of a telescoping support means for a kickstand with the fork of a bicycle frame shown in phantom;

FIG. 2 is an elevational view of the support means of FIG. 1;

FIG. 3 is an elevational view, partly in section, of a portion of the support means of FIG. 2 and illustrating the locking arrangement between the telescoping members of the support means;

FIG. 4 is a sectional view, partly in plan, of the locking arrangement between the telescoping members of the support means of FIG. 1 and taken along line 4—4 of FIG. 3;

FIG. 5 is an exploded perspective view of one of the telescoping members of the support means of FIG. 1 and the clamping means for locking the telescoping members of the support means to each other;

FIG. 6 is an elevational view, similar to FIG. 3, showing a portion of the embodiment of FIG. 7;

FIG. 7 is an elevational view, partly in section, similar to FIG. 2, but showing another embodiment of the telescoping support means of the present invention;

FIG. 8 is an elevational view of a portion of one of the telescoping members of the support means of FIG. 7;

FIG. 9 is a sectional view of a portion of the other of the telescoping members of the support means of FIG. 7 and showing the clamp;

FIG. 10 is a sectional view, partly in plan, of the locking arrangement between the telescoping members of the support means of FIG. 7 and taken along line 10—10 of FIG. 7;

FIG. 11 is an elevational view, similar to FIG. 9, of a portion of the lower telescoping member of another modification of the support means of the present invention;

FIG. 12 is an elevational view, similar to FIG. 8, showing a portion of an upper telescoping member for the support means for use with the lower telescoping member of FIG. 11;

FIG. 13 is a sectional view, taken along line 13—13 of FIG. 11; and

FIG. 14 is a sectional view taken along line 14—14 of FIG. 12;

FIG. 15 is an elevational view showing another embodiment of the telescoping support means of the present invention;

FIG. 16 is an elevational view, partly in section of a portion of the support means of FIG. 15 and illustrating the locking arrangement between the telescoping members of the support means;

FIG. 17 is an elevational view of a portion of one of the telescoping members of the support means of FIG. 15;

FIG. 18 is a sectional view of the other of the telescoping members of the support means of FIG. 15 and showing the clamp;

FIG. 19 is an elevational view of the telescoping member of FIG. 18;

FIG. 20 is a sectional view, partly in plan, of the locking arrangement between the telescoping members of the support means of FIG. 15 taken on line 20—20 of FIG. 15;

FIG. 21 is a sectional view taken along line 21—21 of FIG. 17;

FIG. 22 is a sectional view taken along line 22—22 of FIG. 18.

Referring to the drawings and particularly FIG. 1, there is shown a kickstand 10 for supporting a two-wheeled vehicle such as a bicycle, for example. The kickstand is detachably connected to lower rear fork members 14 and 16 of the frame of a bicycle that is to be supported by the kickstand.

The kickstand has a bracket 18 that is supported by the rear fork members 14 and 16 by means of a plate 65, having wings 74 and 76, secured to said bracket by bolts 55 and a nut 61 in the manner more particularly shown and described in our copending patent application entitled Kickstand for Two-Wheeled Vehicle, Ser. No. 843,308 filed July 22, 1969. The bracket 18 of the kickstand pivotally mounts telescoping support means 26 of the present invention for movement between a vehicle supporting position in which the support means engages the ground to support the bicycle (This is the position shown in FIG. 1.) and a retracted position in which the support means is disposed so that it does not interfere with the pedal movement of the bicycle.

Since the mounting arrangement of the support means on the bracket 18 is old in the art and does not constitute a part of this invention, it will not be described in detail herein. This type of mounting arrangement is shown and described in our aforesaid copending application.

The support means 26 includes an upper rod or leg 38, a lower hollow rod or leg 40, and securing means 46 for connecting the hollow rod 40 to the upper solid rod 38. The lower hollow rod is slidably mounted on the upper rod so that they are in a telescoping arrangement with each other to change the length of the support means 26 in accordance with the size and/or design of the bicycle. Furthermore, when used with the kickstand disclosed in our aforesaid copending application, the position of the bracket 18 on the fork members 14 and 16 necessitates that the length of the support means 26 be varied.

As shown in FIG. 5, the hollow rod or leg 40 has a longitudinal slit or opening 42 extending along its entire length, and an open or cutaway area 44 therein adjacent its upper end.

The securing means comprises a clamp 46 which surrounds the lower hollow rod 40 in the portion having the cutaway area 44 therein. Thus, when the opposite ends of the clamp 46 are moved into engagement with each other through a bolt 48 and a nut 50, the clamp engages the upper rod 38 at areas 52 and 54 as shown in FIG. 4. The inner surface of the clamp also engages the lower hollow rod 40 in the area of the cutaway area 44.

Accordingly, the clamp 46 locks the telescoping members 38 and 40 to each other by reason of the clamp engaging with portions of both the upper and lower rods. This insures that there is no slippage, accidental or intentional, of the lower rod 40 relative to the upper rod 38 or of the clamp 46 relative to either of the rods when the kickstand 10 is supporting a bicycle or the like.

Any necessary adjustment of the length of the support means 26 is easily accomplished through releasing the clamp 46 from engagement with the rods 38 and 40 by unscrewing the nut 50 from the bolt 48 and then sliding the lower rod 40 and the clamp 46 relative to the upper rod 38. In the phantom line position of FIG. 2, the support means 26 is shown in an extended position in which it has a greater length in comparison with its solid line position.

Referring to FIGS. 6 and 7, there is shown a support means 60 which is similar to the support means 26 in that an upper rod or leg 62 has a lower hollow rod or leg 64 slidably mounted thereon so that the rods 62 and 64 are in a telescoping arrangement. A clamp 66 secures the rods to each other in the same manner as the clamp 46 secures the rods 38 and 40 to each other.

In the embodiment of FIGS. 6–10, the outer surface of the upper rod 62 has a longitudinal area in its lower portion formed with depressions 68, which form a roughened surface. The depressions 68 may be formed by any suitable means such as a punch mark, for example. The depressions 68 are disposed only on the lower portion of the upper rod 62 and only in a longitudinal area that engages the lower rod 64. This area extends for less than half of the circumference of the upper rod 62.

As shown in FIG. 9, the inner surface of the lower rod 64 has depressions 70 in its upper portion. The depressions 70, which form a roughened surface on the lower rod 64, extend for only a short length of the upper portion of the rod 64 and are disposed only in a longitudinal area in which the depressions 68 of the upper rod 62 will engage. This area extends for less than half of the circumference of the lower rod 64. Accordingly, when the depressions 70 of the lower rod 64 are in engagement with each other as shown in FIG. 10, and increased frictional contact is formed therebetween.

As shown in FIG. 7, the lower rod 64 is formed with a wide longitudinal opening 72, which extends the length of the lower rod 64, and has a cutaway area 73 therein adjacent its upper end.

Accordingly, the clamp 66 engages much larger areas of the upper rod 62 in this embodiment than the clamp 46 engages on the upper rod 38 in the embodiment of FIGS. 1 to 5. Because of the increased size of the longitudinal opening 72, the cutaway area 73 results in the lower rod 64 embracing only approximately half of the circumference of the upper rod 62 (see FIG. 10) in the area in which the clamp 66 engages against areas 75 and 78 of the upper rod 62. However, the increased friction between the rods 62 and 64 due to the depressions 68 and 70 insures that there is ample engagement between the upper rod 62 and the lower rod 64 despite the reduced areas of the contacting surfaces.

Any necessary adjustment of the length of the support means 60 is easily accomplished through releasing the clamp 66 from engagement with the rods 62 and 64 and then sliding the lower rod 64 and the clamp 66 relative to the upper rod 62. In the phantom line position of FIG. 7, the support means 60 is shown in an extended position in which it has a greater length in comparison with the solid line position.

Referring to FIGS. 11–14, there is shown another form of the telescoping support means of the present invention in which the outer surface of an upper rod 80 (see FIG. 12) has grooves 82 formed in a longitudinal area on its lower portion. The upper rod 80 slidably receives a hollow lower rod 84, which has grooves 86 formed in a longitudinal area on its inner surface in its upper portion. The longitudinal areas on the rods 80 and 84 extend for less than half of the circumferences of the rods 80 and 84. The hollow lower rod 84 is formed with a longitudinal opening extending for its entire length and a cutaway area to accommodate a clamp 88 in the same manner as the lower hollow rod 64 of the embodiment of FIGS. 6 to 10 if formed.

Accordingly, when the grooves 86 engage with the grooves 82 due to the clamp 88 engaging the rods 80 and 84, there is an interlocking relation formed therebetween since the grooves 82 and 86 are V-shaped as shown in FIGS. 14 and 13, respectively. This produces an increased frictional contact, which is even greater than that formed by the depressions 68 and 70.

Since the remainder of the assembly of the lower hollow rod 84 on the upper rod 80 is the same as for the embodiment of FIGS. 6–10, it will not be described in detail. The clamp 88 engages larger areas of the upper rod 80 in the same manner as the clamp 66 engages the areas 75 and 78 of the upper rod 62.

While the present invention has described the frictional or roughened surfaces as being on both the upper and lower rods of the embodiments of FIGS. 6–10 and FIGS. 11–14, it should be understood that only one of the upper and lower rods could have the roughened or frictional surfaces thereon if desired. This would produce a frictional contact between the upper and lower rods although not of the same degree.

While the present invention has shown the roughened surfaces as being formed by depressions or grooves, it should be understood that any suitable type of roughened surfaces may be employed. It is only necessary that the roughened surfaces increase the frictional contact between the upper and lower rods.

In FIGS. 15–22 we have illustrated another embodiment of our invention in which the outer surface of the upper, solid, elongate rod or leg 100 is provided with elongate flats or side surfaces 102 which extend from a location 104, which represents the uppermost limit which the top edge 106 of the lower rod or leg 112 will assume when in its fully raised or retracted position on rod 100, to the lower end 108 of said rod.

The outer surface 101 of rod 100 between flats 102 includes a plurality of vertically spaced serrations or grooves 110 adjacent the lower end thereof, as best illustrated in FIG. 17. Outer surface 101 is on that side of rod 100 opposite upper horizontal mounting leg 103 which engages mounting bracket 18.

Uniformily satisfactory results have been obtained in those instances wherein leg 100 is fabricated from round-bar stock, and wherein flats 102 are formed in the sides thereof by any suitable means.

The lower leg 112 comprises a tubular sleeve open along its entire length to provide a substantially C-shaped member defined by a pair of substantially parallel, flat, laterally spaced sidewalls 114 interconnected by end wall 116, wherein the spacing of sidewalls 114 is such as to slideably engage flats 102 of leg 100. The outer terminal edge 120 of each of sidewalls 114 is provided with an elongate cutaway portion of recess 130 adjacent the upper end of lower leg but spaced downwardly from the upper end, as best illustrated in FIG. 15.

The recesses 130 are dimensioned whereby to receive a clamp 132 which, as best illustrated in FIG. 20 positively engages not only the spaced sidewalls 114 and end wall 116 of the lower leg, but also portions of that side of the lower leg which are opposite to or remote from serrations 110, as at G—G.

In the preferred embodiment of the invention recess 130 is dimensioned whereby to expose approximately one-half of the circumference of the upper leg within the confines of the said recess whereby to provide an uninterrupted surface area of the upper leg to be engaged directly by portions of the clamp 132.

With particular reference to FIG. 18, it will be noted that the inner surface of end wall 116 of the lower leg is provided with a plurality of vertically spaced serrations or grooves 118 which are adapted to mesh or interlock with corresponding serrations or grooves 110 of the upper leg 100, as illustrated in FIG. 16.

Uniformily satisfactory results have been obtained in those instances in which the upper portion of the end wall of the lower leg has been flattened as at Q, and wherein the extent of said flattened portion is coextensive with the serrations or grooves 118 in the innersurface of said end wall.

The kickstand leg illustrated in FIG. 15 will positively remain in any adjusted position against accidental or unintentional movement, both longitudinally and radically. The laterally spaced sidewalls 114 of the lower leg slidably engage the flats 102 of the upper leg whereby to positively prevent relative turning of the lower leg relative to the upper leg incident to adjustment and/or use of the kickstand.

From the foregoing it will be noted that we have provided support means for a kickstand, the length of which may be quickly adjusted and positively held in any position to which it is adjusted.

What is claimed is:

1. An adjustable bicycle kickstand support comprising:
a first member;
a second member mounted in telescoping relation to said first member;
said second member having a cutaway area;
a clamp surrounding said second member at said cutaway area;
and means to tighten said clamp to engage said first member through said cutaway area on said second member and to engage said second member to lock said first and second members to each other.

2. An adjustable support set forth in which:
said second member is a hollow tubular sleeve open its entire length;
and said cutaway area in said second member is wider than the opening along said second member.

3. An adjustable support set forth in claim 2 in which at least one of the contacting surfaces of said first and second members is roughened to increase the frictional contact therebetween.

4. An adjustable support set forth in claim 3 in which the roughened surface of at least one of said first and second members if formed by depressions.

5. An adjustable support set forth in claim 3 in which said cutaway area in said second member exposes at least half of the periphery of said first member.

6. An adjustable support set forth in claim 1 in which each of the contacting surfaces of said first and second members has grooves therein to form an interlocking connection between said first and second members.

7. An adjustable kickstand support comprising an upper solid leg and a lower hollow leg slidably mounted on the upper leg, said upper leg including flats on opposite sides thereof, said lower leg comprising a tubular C-shaped sleeve including an end wall and a pair of flat, parallel, laterally spaced sidewalls each having an elongate terminal edge remote from said end wall, said sidewalls slidably engaging the flats of the upper leg, an elongate recess provided in the terminal edges of each of said sidewalls, and clamp means embracing said legs at said recesses to lock said legs to each other.

8. An adjustable support as called for in claim 7 wherein the upper leg and lower leg are each provided with interlocking vertically spaced serrations.

9. An adjustable support as called for in claim 8 wherein the spaced serrations are located in the inner surface of the end wall of the lower leg, and on an outer surface of the upper leg.

10. An adjustable support as called for in claim 9 wherein the clamp means engages the end and sidewalls of the lower leg and portions of the upper leg which are exposed between the recesses in the terminal edges of said lower leg.

11. A kickstand for a two-wheeled vehicle comprising;
a bracket;
means to connect said bracket to a part of the vehicle;
lengthwise adjustable support means pivotally mounted on the bracket for swinging movement between a vehicle-supporting position and a retracted position;
the support means comprising;
a first member pivotally connected to the bracket;
a second member adjustably connected with the first member; one of the members having a cutaway area formed therein, and
locking means on one of the members and engaging both members, through the cutaway area and locking them together in adjusted position.

12. The kickstand according to claim 11 in which:
said second member is split along its entire length;
said second member has a cutaway area formed therein;
and a clamp engaging said first member through said cutaway area in said second member.

13. The kickstand according to claim 12 in which said cutaway area in said second member extends for at least half of the periphery of said second member.

14. The kickstand according to claim 12 in which at least one of the contacting surfaces of said first and second members is roughened to increase the fractional contact therebetween.

15. The kickstand according to claim 14 in which the roughened surface of at least one of said first and second members is formed by depressions.

16. The kickstand according to claim 12 in which both of the contacting surfaces of said first and second members are roughened to increase the frictional contact therebetween.

17. The kickstand according to claim 11 in which the locking means is on the second member and engages the first member through the cutaway area.

18. The kickstand according to claim 17 in which the locking means is a clamp having means associated therewith to move the clamp into engagement with the first and second members through the cutaway area.

19. The kickstand as set forth in claim 11 wherein the second member telescopically receives the first member with the cutaway area formed in the second member and the locking means being mounted on the second member.

20. The kickstand according to claim 11 in which the first and second members having contacting surfaces with at least one of the contacting surfaces being roughened to increase frictional contact therebetween.

21. The kickstand according to claim 20 in which the roughened surface of at least one of said first and second members is formed by depressions.

22. The kickstand according to claim 11 in which the first and second members have contacting surfaces with the surfaces being roughened to increase frictional contact therebetween.

23. The kickstand according to claim 22 in which the roughened surface of each of said first and second members is formed by depressions.

24. The kickstand according to claim 11 in which the first and second members have contacting surfaces thereon, the surfaces having grooves thereon, the grooves providing an interlocking connection between the members.

* * * * *